United States Patent
Sherry

(10) Patent No.: US 7,053,938 B1
(45) Date of Patent: May 30, 2006

(54) SPEECH-TO-TEXT CAPTIONING FOR DIGITAL CAMERAS AND ASSOCIATED METHODS

(75) Inventor: John W. Sherry, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/414,400

(22) Filed: Oct. 7, 1999

(51) Int. Cl.
H04N 5/76 (2006.01)

(52) U.S. Cl. .................. 348/231.4; 348/462; 396/312; 386/38; 386/96

(58) Field of Classification Search ............ 348/231.3, 348/231.4, 231.5, 62; 396/211, 297, 310, 396/312, 318
See application file for complete search history.

(56) References Cited

U.S. PATENT DOCUMENTS

| | | | |
|---|---|---|---|
| 4,742,369 A * | 5/1988 | Ishii et al. .................. 396/213 |
| 5,031,122 A * | 7/1991 | Witty ....................... 346/107.2 |
| 5,276,472 A * | 1/1994 | Bell et al. .................... 396/312 |
| 5,546,145 A * | 8/1996 | Bernardi et al. ............. 396/312 |
| 5,786,851 A * | 7/1998 | Kondo et al. ............. 348/222.1 |
| 5,940,121 A * | 8/1999 | Mcintyre et al. ....... 348/207.99 |
| 5,995,936 A * | 11/1999 | Brais et al. .............. 369/25.01 |
| 6,031,526 A * | 2/2000 | Shipp ....................... 715/500.1 |
| 6,104,430 A * | 8/2000 | Fukuoka .................. 348/231.6 |
| 6,683,649 B1 * | 1/2004 | Anderson .............. 348/333.05 |

* cited by examiner

Primary Examiner—James J. Groody
Assistant Examiner—James A. Fletcher
(74) Attorney, Agent, or Firm—Schwegman, Lundberg, Woessner & Kluth, P.A.

(57) ABSTRACT

A digital camera includes a processor and a microphone. The camera captures audio speech and converts the speech to text. The text can be combined with a captured image to provide a composite file. The processor executes an instruction set which performs the audio to text conversion. Text conversion is activated using either a user activated input control or through voice commands.

5 Claims, 4 Drawing Sheets

SPEECH-TO-TEXT CAPTIONING FOR DIGITAL CAMERAS AND ASSOCIATED METHODS

TECHNICAL FIELD

The inventive subject matter relates generally to digital cameras and in particular the inventive subject matter relates to combining captured speech with a captured image in a digital camera to store a composite digital data file.

BACKGROUND INFORMATION

The field of photography has experienced significant advancements with the development of digital cameras. These cameras capture images and store the images as a digital file. Some cameras include features to allow for text to be superimposed on images. For example, a date or caption such as "1999 vacation" can be entered and superimposed on pictures. This text is typically used for several pictures and changes are relatively difficult.

In a similar manner, some cameras include a feature to capture speech. The speech is stored as a separate audio file from the image file. The two files are usually named in a similar manner (different extension), such as 0021.jpg and 0021.mpa for respective image and speech files for picture 0021. Playback of the audio file is awkward on a device other than the camera.

For the reasons stated above, and for other reasons stated below which will become apparent to those skilled in the art upon reading and understanding the present specification, there is a need in the art for a camera which allows for custom picture annotation using an audio input.

DETAILED DESCRIPTION

In the following detailed description of the preferred embodiments, reference is made to the accompanying drawings which form a part hereof, and in which is shown by way of illustration specific preferred embodiments in which the inventive subject matter may be practiced. These embodiments are described in sufficient detail to enable those skilled in the art to practice them, and it is to be understood that other embodiments may be utilized and that logical, mechanical and electrical changes may be made without departing from the spirit and scope of the present invention. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of embodiments of the inventive subject matter is defined only by the claims.

Figure 1:
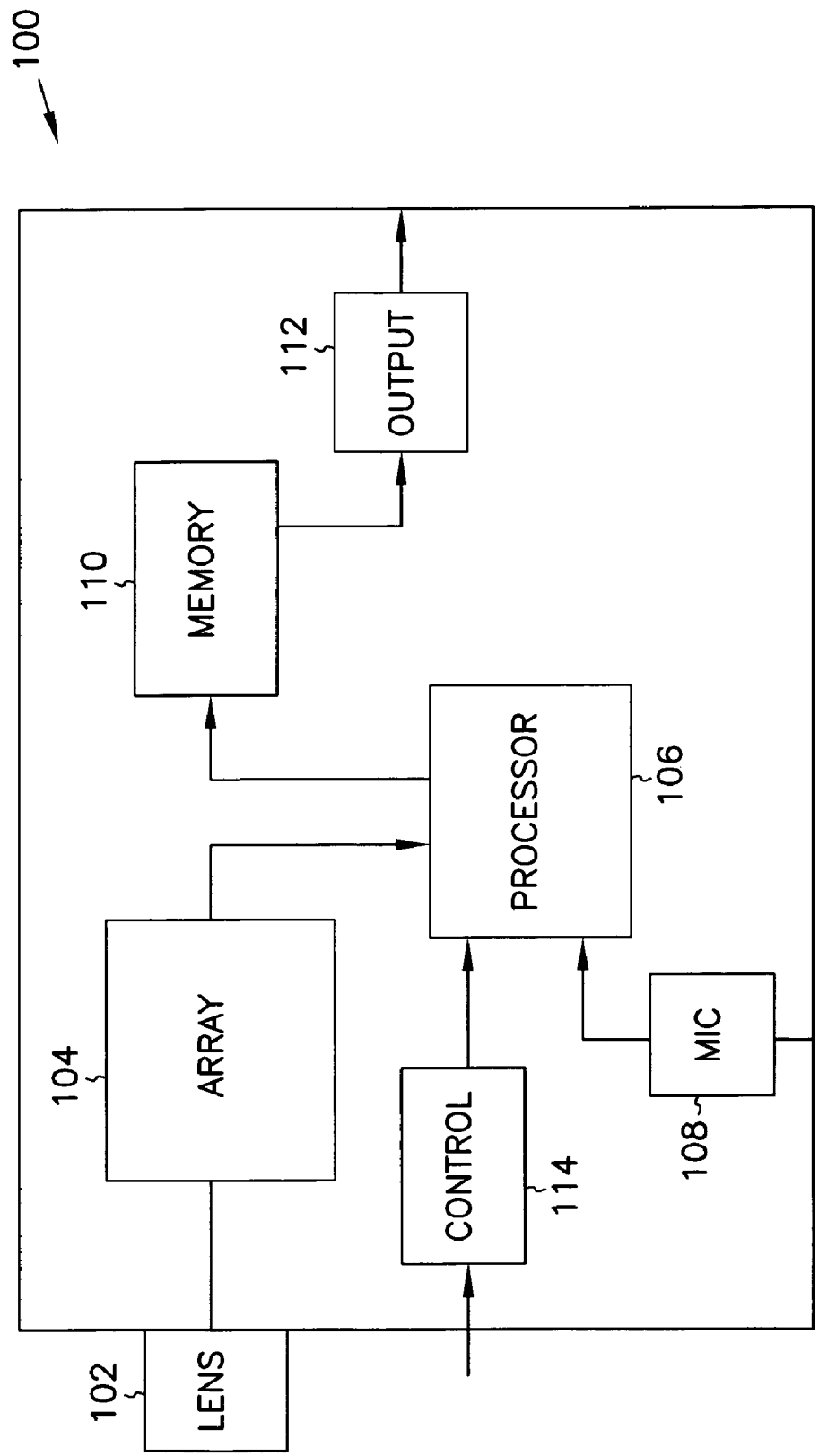
FIG. 1 is a block diagram of a camera according to one embodiment of the present invention.

FIG. 1 illustrates a digital camera 100 according to one embodiment of the present invention. The camera includes an input lens 102 (including a shutter) for directing light to a light sensitive array 104. In operation the shutter is activated to direct a light image onto the array. This array can be any photosensitive array, such as a charge coupled device (CCD). CCDs have dominated vision applications because of their superior dynamic range, low fixed-pattern noise and high sensitivity to light. The array is coupled to a processor 106. The processor can transfer the image captured in the array to memory 110. Numerous images stored in the memory can be output through output circuitry 112. A microphone 108 is coupled to the processor for capturing speech, as explained below. The processor can process the speech and then route the speech to the memory for storage. The term processor as used herein encompasses circuitry required to convert the light image to digital data. Further, the processor can include any control circuitry needed to operate the camera, including output operations.

In operation, a user of the digital camera can activate a speech capturing operation using control 114. In one embodiment, control 114 comprises a switch which can be activated when speech is desired. Other types of control circuitry are contemplated, including speech recognition using the microphone and processor. In this embodiment, a pre-determined audio command is used to "wake-up" the camera speech capture mode. When the processor is in the speech capture mode, output speech signals provided by the microphone are converted to text using the processor. As such, the processor operates a speech translation operation. This operation is performed by executing a set of instructions which instruct the processor to convert the received speech. The text is then used to add captions to the photograph which was taken most recently.

Figure 2:
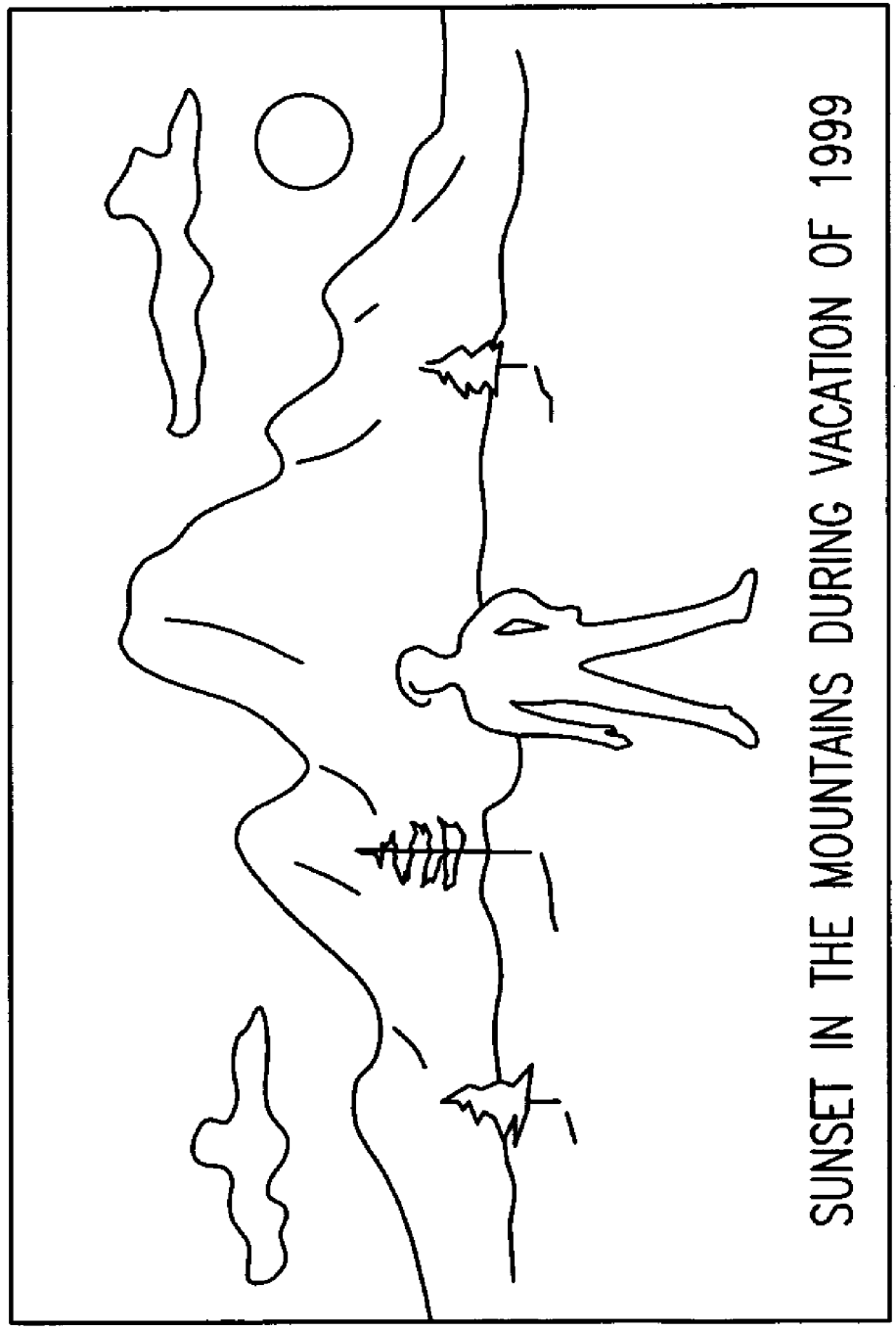
FIG. 2 is an example photograph including a text message.

Referring to FIG. 2, a sample photograph is provided. The photograph includes a text message which describes the photograph as "sunset in the mountains during vacation of 1999". This text message is intended to illustrate the flexibility of the inventive subject matter to customize text on each photograph. The processor 106 can store the text message as either a separate text file (text data), or combine the photograph data (digital image) and the text data as one digital file. As separate files, the speech can be stored as an audio file, or converted to text. By combining the files, unwanted separation of the photo and text can be avoided. Further, the text can be separately stored in parallel to the photo/text file to provide a level of redundancy.

Figure 3:
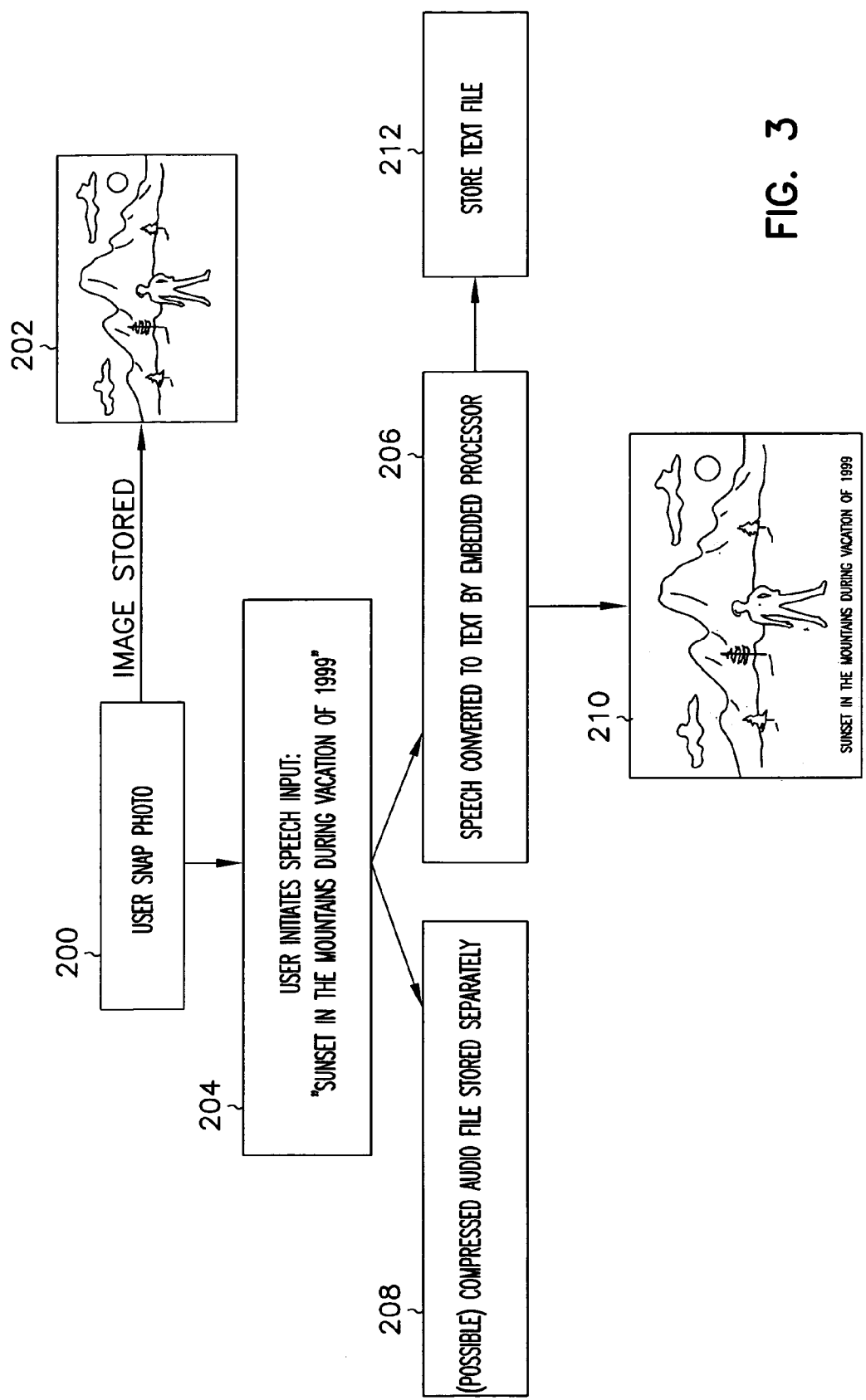
FIG. 3 is a flow chart of an example operation of the camera of FIG. 1.

FIG. 3 provides an illustration of the operation of the digital camera. A user takes a photograph at 200 by activating the shutter. The photograph image is stored at 202. The user initiates audio speech input at 204, and the speech is converted to text at 206. Alternatively, a compressed audio file is stored of the speech at 208. The text is combined with the image at 210 to provide a common file which is stored in memory. Alternately, the text is stored as a separate file at 212.

Figure 4:
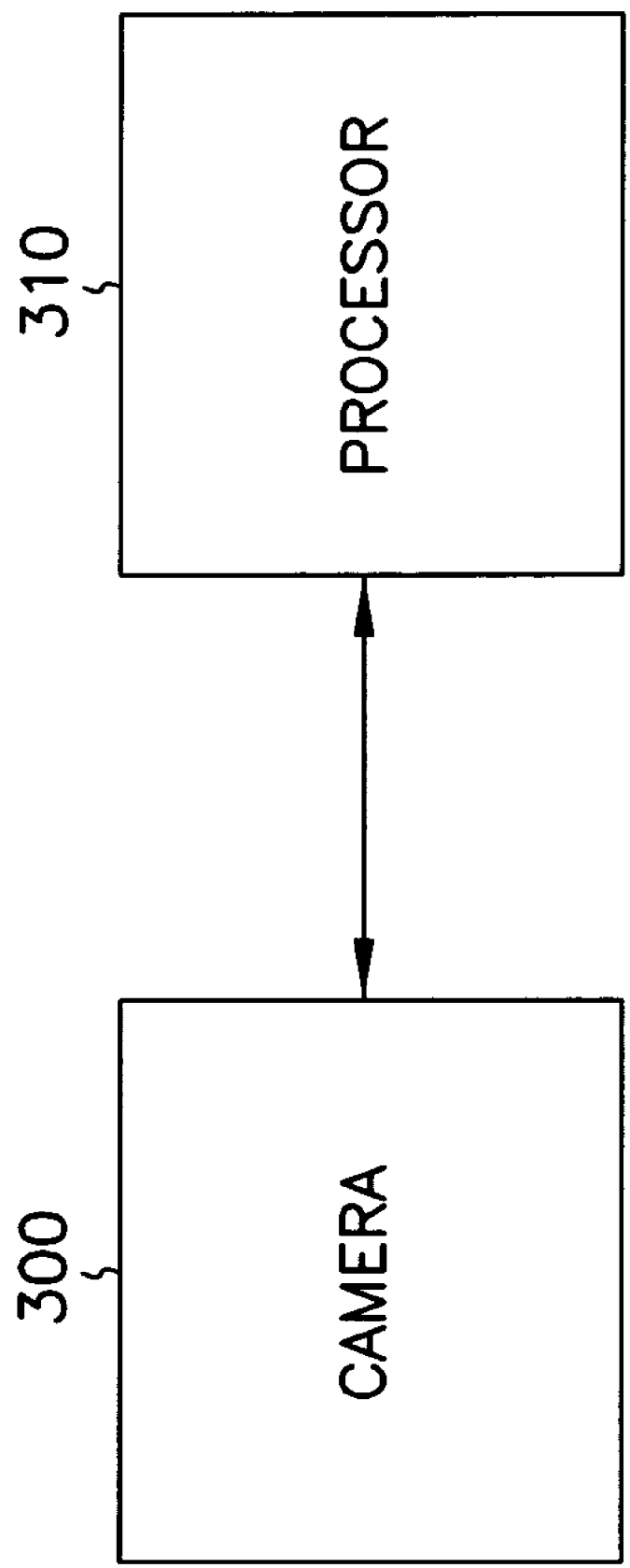
FIG. 4 illustrates an alternate embodiment of a camera system of the present invention.

FIG. 4 illustrates a camera system of the present invention. The system includes a digital camera 300 and an external processor 310. The camera is substantially similar to the camera of FIG. 1 except the speech to text processor is external to the camera. The camera includes a microphone to capture speech. The speech and digital image are communicated to the external processor as separate files. The processor converts the speech to text, as explained above, and combines the image and text into a single data file. This common file can be stored by the processor. This system can provide the benefits explained above without the physical limitations of a portable camera. As such, the system is better suited to a studio setting. Again, this process allows for the combination of text and image into a common file.

A digital camera has been described which includes a processor and a microphone. The camera captures audio speech and converts the speech to text. The text can be combined with a captured image to provide a composite file. The processor has been described as executing an instruction set which preforms the audio to text conversion.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the inventive subject matter. Therefore, it is manifestly intended that embodiments of this invention be limited only by the claims and the equivalents thereof.

What is claimed is:

1. A portable digital camera comprising:
    a lens having a shutter;
    a photo-sensitive array to capture an image;
    a microphone to capture audio input;
    a memory; and
    a processor coupled to the photo-sensitive array, microphone, and memory,
    wherein the processor is to convert captured audio input provided by the microphone into a digital text file and compressed audio file,
    wherein the processor is further to convert the captured image into a digital image file,
    wherein the processor is to store the digital image file and the digital text file as a single composite digital data file in the memory, and
    wherein the processor is further to store the compressed audio file as a separate file in the memory.

2. The camera of claim 1 further comprising an input control to activate the processor to capture audio input provided via the microphone.

3. The camera of claim 2 wherein the input control is to respond to an audio command provided via the microphone to the processor.

4. A method of operating a portable digital camera comprising:
    activating a shutter of the camera to capture a light image;
    converting the light image to digital image data;
    activating an audio input;
    capturing audio input;
    converting the audio input into text data and compressed audio;
    storing the text data and the digital image data as a composite digital file in a memory of the camera; and
    additionally storing the compressed audio as a separate digital file in the memory.

5. A method of operating a portable digital camera comprising:
    activating a shutter of the camera to capture a light image using a photosensitive array;
    converting the light image to digital image data;
    activating an audio input;
    capturing audio input;
    converting the audio input into text data and a compressed audio file;
    combining the digital image data and the text data into a single digital data file, and storing the single digital data file in a memory of the camera; and
    storing the compressed audio file as a separate file in the memory.

* * * * *

UNITED STATES PATENT AND TRADEMARK OFFICE
CERTIFICATE OF CORRECTION

| | | |
|---|---|---|
| PATENT NO. | : 7,053,938 B1 | Page 1 of 1 |
| APPLICATION NO. | : 09/414400 | |
| DATED | : May 30, 2006 | |
| INVENTOR(S) | : Sherry | |

It is certified that error appears in the above-identified patent and that said Letters Patent is hereby corrected as shown below:

Column 3, line 29, in Claim 1, before "compressed" insert -- a --.

Signed and Sealed this

Twenty-first Day of November, 2006

JON W. DUDAS
*Director of the United States Patent and Trademark Office*